W. A. GILL.
SEGMENTAL ROTARY VALVE.
APPLICATION FILED MAR. 26, 1915.
1,164,495.
Patented Dec. 14, 1915.
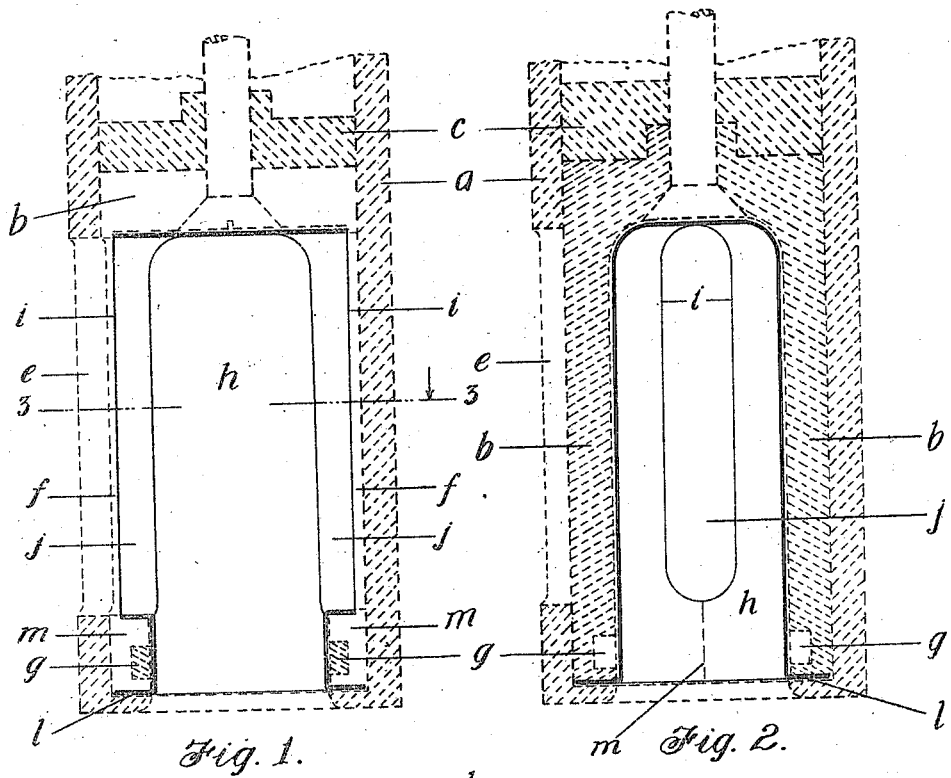
Fig. 1.   Fig. 2.
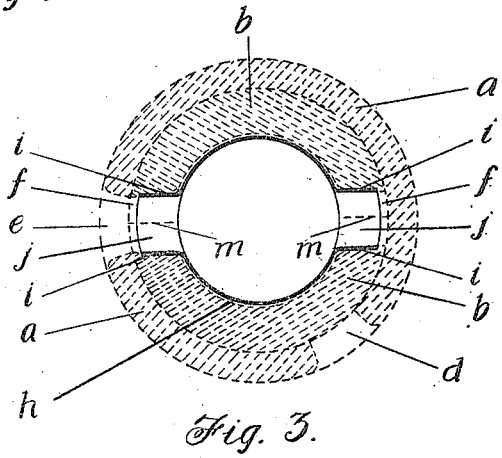
Fig. 3.
WITNESSES:
INVENTOR
Wm. A. Gill,
BY 
ATTORNEY

UNITED STATES PATENT OFFICE.

WILLIAM A. GILL, OF PORTLAND, OREGON, ASSIGNOR TO GILL-COOK VALVE CO., OF PORTLAND, OREGON, A CORPORATION OF OREGON.

SEGMENTAL ROTARY VALVE.

1,164,495.　　　　Specification of Letters Patent.　　Patented Dec. 14, 1915.

Application filed March 26, 1915. Serial No. 17,281.

*To all whom it may concern:*

Be it known that I, WILLIAM A. GILL, a citizen of the United States, and a resident of Portland, county of Multnomah, and State of Oregon, have invented a new and useful Improvement in Segmental Rotary Valves, of which the following is a specification.

My invention relates to improvements in rotary valves for internal combustion engines, and has specifically to do with a valve made of longitudinally divided segments, such, for example, as the type of valve described in my Letters Patent dated March 9, 1915, No. 1,130,896.

One of the main objects of my invention consists in combining with the valve an inner shell or thimble-like lining, revolving with the valve, though spaced in greater part from the inner faces of the valve parts, and serving to prevent lubricant from working into the interior of the valve between and through the spaces of the valve segments. If the lubricant is permitted to work into the interior of the valve, it would cause undue carbonization in the combustion chamber and also produces very undesirable conditions.

Another advantage obtained by my improvement is there will be no unnecessary pressure of the segmental valve parts against the walls of the valve chamber, for the thimble being a one-piece construction, sustains the strain of the explosion in the main, and proportionately protects the valve segments; but at the same time since the thimble is made of slightly smaller cross-section than the interior of the valve, when the latter's parts are seated against the walls of the valve chamber, sufficient gas is permitted to pass between the exterior of the thimble and the inner face of the valve parts to permit the latter to be held effectively by the pressure of the gas in gas-tight relation with the walls of the valve chamber.

Another advantage obtained by my improvement is that since the thimble is not in close mechanical contact with the valve, but is in greater part spaced therefrom, the thimble will have a tendency to retain a higher temperature in itself, and thus maintain a higher temperature on the interior wall of the combustion chamber of the valve than that normally maintained by the valve parts, in so doing increasing the thermal efficiency of the motor. In other words; the gas in the space between the thimble and the wall parts will serve as an insulator, and effectively retard the wasteful dispersion of the heat, through the medium of the valve, the walls of the valve chamber and the water jacket.

Another advantage obtained by my improvement is this: Since, through the medium of a thimble, the valve parts are maintained in relatively lower temperature, the efficiency of the film of lubricant covering the exterior of the valve parts is not diminished as would be the case if the valve were heated to a higher degree.

Another advantage of my invention is that frequently in valves of the type mentioned, since the fuel used is kerosene, or other heavy oils, it is advantageous to use a spray of water in combination with the incoming mixture. Under such conditions, the thimble provided in my valve will effectively prevent the water from working through the grooves between the divided faces of the valve members, which, if not prevented, would have a tendency to cause the water so admitted to intermix to a certain extent with the lubricating film on the exterior of the valve.

The above-mentioned features of my invention are all fully shown in the accompanying drawings, in which—

Figure 1 is a diagrammatic illustration of my invention, showing a vertical section of a segmental valve provided with an interior thimble; the view corresponds with the horizontal section shown in Fig. 3; thus the inner face of the far half of the valve is seen, and the valve casing and coupling of valve to drive-head are shown in section by broken lines; Fig. 2 is a view similar to Fig. 1, but showing the valve and thimble turned through an angle of 90°, and thus both valve segments are shown in section; Fig. 3 is a horizontal section on the line 3—3 of Fig. 1.

The valve casing or chamber is indicated by *a*.

The valve is made of longitudinally divided segments *b, b*.

*c* is the valve drive-head.

The valve casing is made with inlet and exhaust openings *d* and *e*, respectively, and the valve segments are made with ports $f, f$, adapted to register with said inlet and exhaust openings $d$ and $e$, at certain points during the rotation of the valve.

The expansion rings of the valve are indicated by $g, g$.

In the valve is inserted an inner shell or thimble $h$, shaped approximately to correspond with the contour of the inner faces of the valve, but of smaller exterior diameter than the interior space of the valve, when its parts are pressed against the walls of its chamber, so as to thus provide a space between the exterior of the thimble and inner faces of the valve parts, for the purposes specified. The thimble is made with flanges $i$, at the margins of its two apertures, or openings $j, j$, which correspond with the ports $k, k$ of the valve; and such flanges extend into the ports of the valve and serve to connect the thimble with the valve so that it will rotate with the latter. The edges of the valve ports are recessed so that the tops of the flanges $j, j$, of the thimble will come flush with the upper surface of the valve ports, as shown in Fig. 1. The bottom of the thimble $h$, is made with a peripheral flange $l$, which, however, is so arranged as not to touch the sides or the bottom of the valve chamber. The flange $l$ serves to prevent the film of lubricant, which runs down the space between the thimble and the valve, from flowing between the faces $m$, of the valve parts, down to the bottom of the valve and thus entering the combustion chamber.

The manner in which my device operates is as follows: The spaces between the abutting valve segments are indicated by the line $m$, in Figs. 2 and 3. As the valve rotates, the lubricant would have a tendency to force its way through such spaces between the valve parts and in this way work itself into the interior of the valve to the combustion chamber, but cannot because the thimble effectually seals said space $m$. Furthermore, a portion of the force of the explosion is taken up by the thimble without acting directly on the valve, and the valve being correspondingly relieved. In this way, as apparent, the thimble acts as a shock-absorber and prevents the full force of the explosion being imposed on the valve parts, which would cause undue pressure and have a tendency to crowd out the lubricant.

I claim:

1. The combination with a segmental valve of the type mentioned, of a thimble inserted within the valve, the exterior diameter of the thimble being less than the diameter of the inner space of the valve when its segments are seated against the walls of its chamber, said thimble being provided with apertures corresponding to the ports of the valve segments, and means for operatively connecting the thimble with the valve so as to rotate with the latter.

2. The combination with a segmental valve of the type mentioned, of a thimble inserted within the valve, the exterior diameter of the thimble being less than the diameter of the inner space of the valve when its segments are seated against the walls of its chamber, said thimble being provided with apertures corresponding to the ports of the valve segments, and means for operatively connecting the thimble with the valve so as to rotate with the latter, said thimble being made with a peripheral flange projecting from its open end over the valve segments, for the purpose specified.

3. The combination with a segmental valve of the type mentioned, of a thimble inserted within the valve, the exterior diameter of the thimble being less than the diameter of the inner space of the valve when its segments are seated against the walls of its chamber, said thimble being provided with apertures corresponding to the ports of the valve segments, said thimble being made with flanges on the margins of its said apertures, said flanges extending into said valve ports and thus serving to connect the thimble with the valve.

4. The combination with a segmental valve of the type mentioned, of a thimble inserted within the valve, the exterior diameter of the thimble being less than the diameter of the inner space of the valve when its segments are seated against the walls of its chamber, said thimble being provided with apertures corresponding to the ports of the valve segments, said thimble being made with flanges on the margins of its said apertures, said flanges extending into said valve ports and thus serving to connect the thimble with the valve, said thimble being made with a peripheral flange projecting from its open end over the valve segments, for the purpose specified.

WILLIAM A. GILL.

Witnesses:
Wm. C. Schmitt,
D. E. Crabb.